Figure 1:
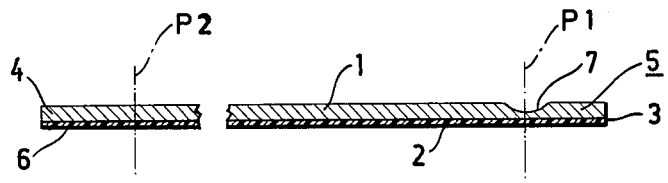

May 1, 1962  H. S. V. JARUND  3,032,251
LAMINATE SHEET MATERIAL AND PACKAGE PRODUCED THEREFROM
Filed Dec. 31, 1959

United States Patent Office 3,032,251
Patented May 1, 1962

3,032,251
LAMINATE SHEET MATERIAL AND PACKAGE
PRODUCED THEREFROM
Harry Sigurd Valdemar Jarund, Lund, Sweden, assignor to Hermorion Ltd., Toronto, Ontario, Canada, a company of Canada
Filed Dec. 31, 1959, Ser. No. 863,185
Claims priority, application Sweden Jan. 8, 1959
2 Claims. (Cl. 229—22)

The present invention relates to a flexible laminate sheet material having two parallel longitudinal edges and being of the kind comprising a body layer and a relatively thinner layer of a heat and pressure sealable plastic material and adapted, first through bending into tubular shape with its plastic layer face turned inwardly, and then through joining the plastic layer faces of its margins corresponding each to an individual one of said parallel sheet edges and folding over one margin about its inner boundary line parallel to the adjacent sheet edges into substantially complete engagement with the adjacent portion of said sheet body later, to be converted into a tube for use in those processes of producing packages, where for each package the two ends of a tube length are sealed, thereby to enclose a filling material quantity introduced in said tube length, and the sealing operation at least at one tube length end involves flatpressing the tube wall and supplying heat to the inner plastic layer thereof along a corresponding zone transverse to the tube axis.

Hitherto laminate sheet materials of this kind have generally been of uniform thickness along the entire width thereof. Therefore, those tubes produced therefrom having a so-called "turned-over" or "back" seam and hence a continuous inner plastic layer or lining had a longitudinal seam of substantially three times the sheet thickness along its entire width. In the transverse seal of the package type mentioned obtained through flatpressing and heat supply such a longitudinal tube seam was a drawback often imperiling the tightness of the packages.

To avoid said drawback there has been suggested the solution involving thinning the two sheet margins forming the seam. The purpose of this thinning operation was to reduce, to the greatest extent possible, the thickness of the longitudinal seam to that of the remaining portions of the sheet material. Since a sheet or web material having a margin thinned towards the corresponding sheet or web edge into more or less the cross-section of an edge only with great difficulties lends itself to winding into a roll and to storage or transport in roll, because the turns of the thinned margin do not support each other, one has been reduced to the necessity of carrying out the thinning of the sheet or web material in connection with the conversion thereof into tube form, i.e. in connection with the packaging process.

The present invention has for its object to provide a laminate sheet or web material easily lending itself to winding into a roll and yet positively contributing to tighter transverse flatpressing seals of packages produced from tubes converted from the sheet or web material and having a longitudinal back seam. In the latter respect the invention resides partially in the discovery that the untightness of said transverse seals of tube walls having a longitudinal seam of increased thickness does not so much depend on the seam thickness per se as, far rather, on the distribution thereof along the width of the seam.

Thus, the laminate web or sheet material according to the invention is substantially characterized therein that said plastic layer is of substantially uniform thickness over the entire sheet width and that said body layer is of substantially uniform thickness over the entire sheet width with the exception of a grooved zone symmetrical about said inner boundary line of said margin to be folded over onto said body layer of the sheet, said zone being of a width less than twice that of said margin and having a cross-section which is thinned concavely or otherwise in relation to the two adjacent body layer portions in such a manner that said intended folding-over of the corresponding margin may be carried out at a substantially reduced folding radius as compared with that of a sheet having a body layer of substantially uniform thickness along the entire width of the sheet.

Figure 2:
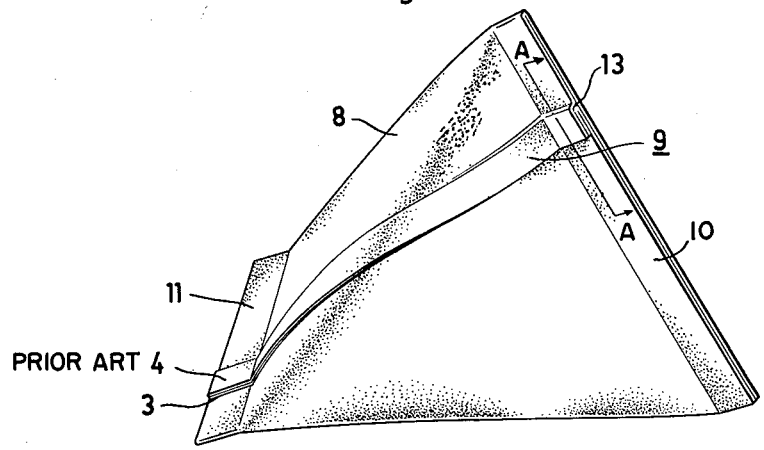
Figure 3:
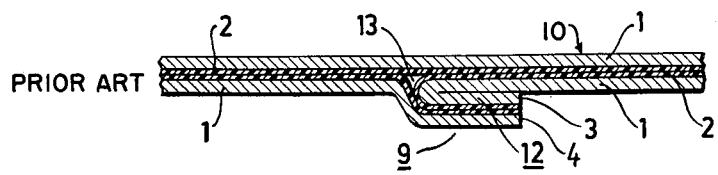
Figure 4:
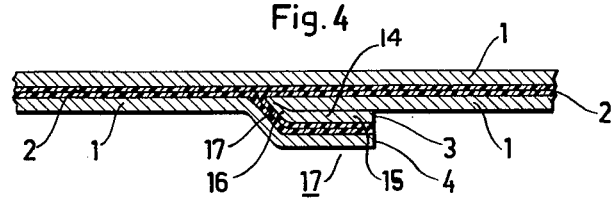

The invention will in the following be described more in detail, reference being made to the accompanying drawing on which:

FIG. 1 illustrates in cross-section, a laminate sheet according to the invention, FIG. 2 is a view in elevation of a tetrahedron-shaped package produced from a tube having a folded-over back seam of conventional type, FIG. 3 is a section along line A—A in FIG. 2, and FIG. 4 is a section similar to FIG. 3 of a back seam produced from a web or sheet according to the invention.

The web or sheet shown in FIG. 1 comprises a body layer 1 and a relatively thinner layer 2 of a heat and pressure sealable plastic material. The two longitudinal edges 3 and 4 of the sheet are assumed to be parallel to each other. As the sheet is intended to be formed into a tube and to be joined along its edges 3 and 4 plastic layer-to-plastic layer it is deemed suitable herein to introduce also the expression "margin" referring to those sheet portions along the edges 3 and 4 extending over each other in the intended seam. Thus, to the edge 3 there corresponds a margin 5 extending to the dot-and-dash line P1 in FIG. 1 and to the edge 4 there corresponds a margin 6 extending to the dot-and-dash line P2. The plastic layer 2 is of uniform thickness over its entire width. The body layer 1 is of uniform thickness to the largest part of the sheet width but has symmetrically about the inner boundary of the margin 5, herein illustrated by the dash-and-dot line P1, a longitudinal concavely thinned groove portion 7 of a width less than twice the width of the margin 5, said thinned portion 7 hence on both sides thereof being bounded by body layer portions of full thickness.

In the intended use of the sheet or web the margin 5 will be folded over about its inner boundary line parallel to the edge 3 and situated in the plane indicated by line P1, so that it by its entire body layer face will be brought into engagement with the adjacent portion of the body layer 1. The thinned portion 7 will cause the resultant fold in its portion adjacent to the new outer edge to assume a cross-section shape tapering towards said new outer edge instead of being substantially rectangular over its entire width as with sheets or webs being of uniform thickness over their entire width and having margins of equal widths. If the outer margin in the longitudinal seam is narrower or wider than the other margin the seam will assume a correspondingly stepped shape at its boundary corresponding to the web or sheet edges. For the sake of simplicity it is assumed in the continued description that the margins are of substantially equal widths without excluding the possibility of margins being of unequal widths.

Since the thinned portion 7 does not extend to the very web edge 3 the winding of the web into a roll does not involve any difficulties, nor do the transport or storage of such a roll. The reason is that the web has its full thickness at the edge 3, and therefore the turns of the roll will support each other along the edge 3 and hence the web in its roll shape will not be as liable to get damaged by impacts as a web one margin of which is thinned to the very web edge.

The tetrahedron-shaped package 8 shown in FIG. 2 is of the kind produced from a tube having a longitudinal back seam 9 through flatpressing and heat supply along narrow zones transverse to the tube axis and alternatingly in one and the other of two planes perpendicular to each other, thereby to yield individual sealed packages. In the case illustrated the tube from which the package 8 is produced is assumed to correspond to the web or sheet illustrated in FIG. 1 with the exception that the body layer thereof has no thinned portion 7. The web has been bent into tubular shape with its plastic layer 2 turned inwardly and its margins 5 and 6 have been joined plastic layer-to-plastic layer, and thus the two web edges 3 and 4 are situated outside the package 8. The structural shape of the seam 9 is obvious from FIG. 3 showing a cross-section view thereof. From said figure it is also clearly apparent that, in the sealing fins 10 and 11 of the package 8 and due to the rectangular cross-section of the fold 12, there will arise a channel 13 in the transverse seal said channel 13 in fact connecting the interior of the package 8 with the ambient atmosphere. Thus, in case the package is filled with a liquid, said liquid might escape through these two channels 13.

If instead the package is produced from a web according to the invention having the above-mentioned thinned portion 7 the cross-section corresponding to FIG. 3 will assume the shape shown in FIG. 4. The fold 14 obtained through folding over the margin 5 may be said to comprise in cross-section a rectangular portion 15 and a triangular portion 16, the fold 14 tapering from said first-mentioned portion 15 towards that edge of the fold 14 innermost in the seam 17. This will eliminate any channel corresponding to the channel 13.

Preferably, the web or sheet according to the invention is obtained by thinning, in a longitudinal zone corresponding to the zone 7, the body layer of a premanufactured laminate web or sheet material of uniform thickness over its entire width. Said thinning is carried out e.g. through grinding, although in case of body layers of paper or the like the thinning might as well be effected through local compression thereof, e.g. through super-calendering.

Preferably, the cross-sectional shape of the groove resulting from the thinning operation corresponds to an isosceles triangle having its base in the plane containing the free face of the body layer and its triangle apex defined by the two equal triangle sides located in the vicinity of the plastic layer. Of course, the angle opposite to the triangle base should be obtuse. The triangular cross-sectional shape of said groove may also be approximated by a segment of a circle or the like as shown in FIG. 1.

The invention also relates to a package produced from a web or sheet material having the above described thinned portion or groove along and spaced from one web or sheet edge. As mentioned above, in the production of the package in question the web or sheet according to the invention is formed into a tube having a lining comprising the plastic layer 2 of the web or sheet and being provided with a longitudinal seam of the back seam type 17. Through flatpressing and heat-sealing along a zone transverse to the tube axis at least one package seal is obtained.

The tube forming proper may be carried out generally in two different ways. In one method the longitudinal seam 17 will extend parallel to the tube axis, while in the other it will extend along a helix, the web or sheet being helically wound into tube form. Similarly, the longitudinal back seam 17 may be obtained in two different ways, e.g. either through first joining the plastic layer faces of the two margins 5 and 6 and thereafter folding over the fin thus produced into engagement with the tube wall, or by the reverse procedure comprising the steps of first folding over the margin 5 and thereafter join same with the margin 6 plastic layer-to-plastic layer.

I claim:

1. A tubular container blank made from flexible laminate sheet material having two parallel longitudinal edges brought together in a longitudinally extending turned-over seam and comprising an outer body layer and a relatively thinner inner layer of a heat and pressure sealable plastic material bonded to said body layer, said plastic layer being of substantially uniform thickness over the entire width thereof and said body layer also being of substantially uniform thickness over the entire width thereof and including a groove established by a zone of lesser thickness extending parallel to and located inwardly from one of the longitudinal edges thereof, said groove having a concave configuration between the two edges thereof and a width less than twice the distance from the longitudinal center line of said groove to the adjacent edge of said sheet material, and said longitudinal center line of said groove constituting a fold line by which said body layer is folded back upon itself as part of said longitudinal turned-over seam.

2. A container made from a tubular container blank of flexible laminate sheet material as defined in claim 1, said container having at least one end thereof sealed closed along a narrow zone transverse to the longitudinal axis of said tubular container blank and wherein said longitudinal turned-over seam is located intermediate the ends of said sealed transverse zone and intersects the same.

References Cited in the file of this patent

UNITED STATES PATENTS

| | | |
|---|---|---|
| 2,062,618 | Sterling | Dec. 1, 1936 |
| 2,341,056 | Moore | Feb. 8, 1944 |
| 2,741,079 | Rausing | Apr. 10, 1956 |
| 2,808,192 | Raisin | Oct. 1, 1957 |
| 2,902,396 | Reynolds | Sept. 1, 1959 |
| 2,919,800 | Jarund | Jan. 5, 1960 |
| 2,936,940 | Berghgracht | May 17, 1960 |

FOREIGN PATENTS

| | | |
|---|---|---|
| 131,599 | Sweden | Feb. 8, 1951 |
| 1,065,305 | France | Jan. 6, 1954 |